US008590133B2

(12) United States Patent
McGuire et al.

(10) Patent No.: US 8,590,133 B2
(45) Date of Patent: Nov. 26, 2013

(54) SHIM PLACEMENT TOOL

(75) Inventors: Andrew Ivor McGuire, Lexington, KY (US); Juan Manuel Molina, San Antonio, TX (US); Christopher Alton Gipson, San Antonio, TX (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 566 days.

(21) Appl. No.: 12/768,487

(22) Filed: Apr. 27, 2010

(65) Prior Publication Data

US 2011/0258831 A1 Oct. 27, 2011

(51) Int. Cl.
*B23P 11/00* (2006.01)
*B25B 27/00* (2006.01)

(52) U.S. Cl.
USPC ................... 29/446; 29/253; 29/271; 29/270; 29/453; 29/268; 29/278; 81/420; 81/418; 81/116; 451/386

(58) Field of Classification Search
USPC ........... 29/446, 270, 253, 283, 452, 268, 255, 29/257, 278, 235, 445, 271, 453; 51/217 P, 51/218 P, 102; 81/418, 420, 488, 116; 451/181, 386, 391, 404
See application file for complete search history.

(56) References Cited

U.S. PATENT DOCUMENTS

| | | | | | |
|---|---|---|---|---|---|
| 3,768,138 | A | | 10/1973 | Trapp | |
| 4,461,193 | A | * | 7/1984 | Gruber et al. | 81/420 |
| 4,961,291 | A | * | 10/1990 | Lagassee | 451/386 |
| 5,191,690 | A | | 3/1993 | Koehn | |
| 5,345,796 | A | | 9/1994 | Chieh et al. | |
| 5,607,344 | A | * | 3/1997 | Endres | 451/386 |
| 5,676,559 | A | * | 10/1997 | Laub et al. | 439/260 |
| RE36,909 | E | | 10/2000 | Satos | |
| 6,206,772 | B1 | * | 3/2001 | Davis | 451/385 |
| 6,363,949 | B1 | | 4/2002 | Brown | |
| 6,409,152 | B1 | | 6/2002 | Bagley | |
| 6,663,082 | B1 | * | 12/2003 | Ploeger | 254/21 |
| 6,957,478 | B1 | | 10/2005 | Ontiveros | |
| 7,048,255 | B2 | | 5/2006 | Buch et al. | |
| D552,440 | S | | 10/2007 | Wu | |
| 7,311,293 | B2 | | 12/2007 | Mrugalski, Jr. | |
| 2003/0038490 | A1 | | 2/2003 | Elswick | |
| 2005/0023011 | A1 | | 2/2005 | Hixon | |
| 2010/0022330 | A1 | | 1/2010 | Rourke et al. | |

FOREIGN PATENT DOCUMENTS

| | | | |
|---|---|---|---|
| CA | 2478938 | A1 | 3/2005 |
| EP | 0574658 | A1 | 12/1993 |
| EP | 0842843 | A1 | 5/1998 |
| WO | WO-9535184 | A2 | 12/1995 |
| WO | WO-2004052082 | A1 | 6/2004 |

* cited by examiner

*Primary Examiner* — Peter DungBa Vo
*Assistant Examiner* — Kaying Kue
(74) *Attorney, Agent, or Firm* — Gifford, Krass, Sprinkle, Anderson & Citkowski, P.C.

(57) ABSTRACT

A tool for placing a shim between a housing and a component biased towards the housing is provided. The tool can include a handle and a pair of spaced-apart tongs extending outwardly from the handle. In addition, a shim support surface can be located between the pair of spaced-apart tongs. The spaced-apart tongs and the shim support surface can be dimensioned for a shim to nest between the tongs on the shim support surface.

17 Claims, 5 Drawing Sheets

Fig-11
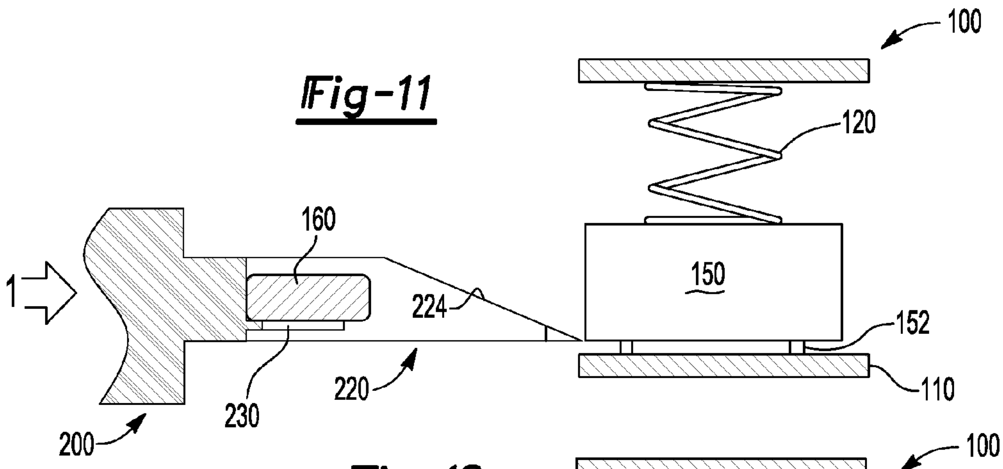
Fig-12
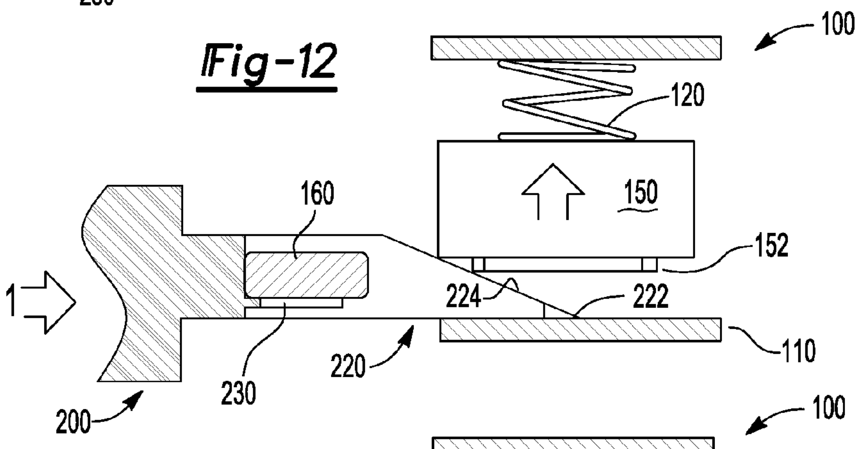
Fig-13
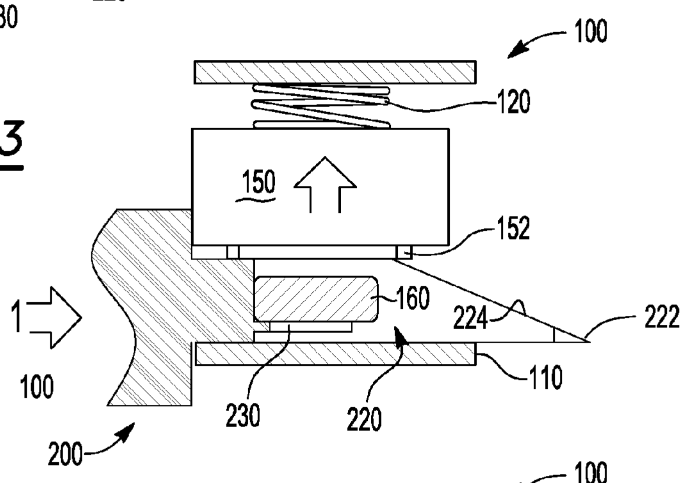
Fig-15
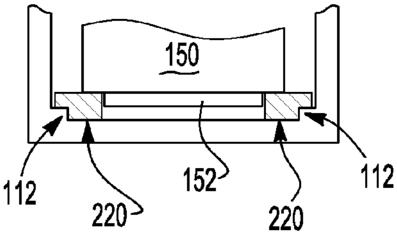
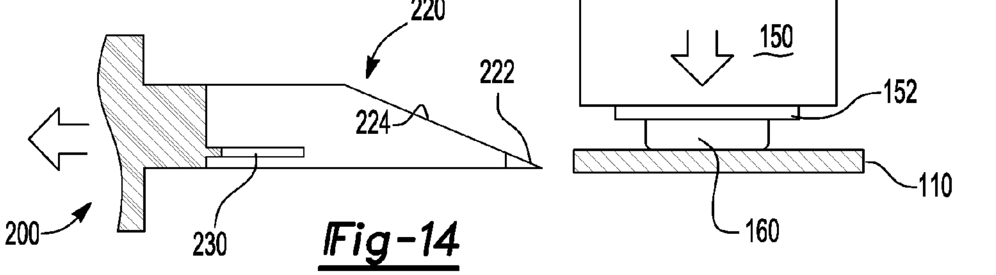
Fig-14

SHIM PLACEMENT TOOL

FIELD OF THE INVENTION

The present invention is related to a tool for placing a shim within a housing, and in particular to a tool having a wedge-shaped front end for placing a shim within a housing.

BACKGROUND OF THE INVENTION

Mechanics depend on a variety of tools to manufacture and/or repair motor vehicles, tractors, trucks, etc. Tools such as screwdrivers, socket wrenches, open-ended wrenches, pry bars, and the like are used to fasten components together, assemble one component within another and/or disassemble one or more components. In some instances, a combination of tools can be required in order to perform more than one function simultaneously. For example, two components can require separation from each other while a third component is placed therebetween. In such an instance, a screwdriver or a pry bar can be used to provide distance between the two components while a third component such as a spacer, shim, etc. is placed between the two components in order to provide a predefined distance therebetween.

Heretofore tools have required that one tool be used for separating such components while another tool or an individual's hand be used to place the third component between the separated two components. Therefore, a tool that can combine the two functions of prying two components apart from each other while affording for placement of a third component therebetween would be desirable.

SUMMARY OF THE INVENTION

A tool for placing a shim between a housing and a component biased towards the housing is provided. The tool can include a handle and a pair of spaced-apart tongs extending outwardly from the handle. In addition, a shim support surface can be located between the pair of spaced-apart tongs. The spaced-apart tongs and the shim support surface can be dimensioned for the shim to nest between the tongs and on the shim support surface.

In some instances, each of the pair of spaced-apart tongs can have a wedge-shaped front end that is operable to slide between the component and the housing, increase a distance therebetween and afford for the shim to slide from its nested position between the pair of spaced-apart tongs to a position between the component and the housing.

The component can be a piston, friction lever, cylinder, pedal arm and the like having a base with a stopper or spacer that extends from the base towards the housing. In addition, the housing can have a base plate, the component and the stopper being biased towards the base plate. Each of the spaced-apart tongs can have a predefined thickness that is greater than a distance the stopper extends from the base of the component. In this manner, the stopper can be spaced apart from the housing when the pair of spaced-apart tongs slides between the component and the housing. In some instances, the predetermined thickness of the spaced-apart tongs is such that the shim can slide between the stopper and the housing for placement behind the stopper, between the component and the housing.

The housing can have a base plate with a pair of spaced-apart step surfaces, one of the step surfaces proximate to and spaced apart from one side of the stopper and another of the step surfaces proximate to and spaced apart from an opposite side of the stopper. In addition, the pair of spaced-apart tongs can have a bottom surface with a rail or ridge having complementary step shapes such that the tool is aligned relative to the housing while sliding between the base plate and the component, and thereby afford accurate placement of the shim between the component and the housing.

A housing, tool and shim assembly can also be provided. The assembly can have a housing with a base plate and a component that is biased towards the base plate. In addition, the component can have a stopper that extends towards the base plate. A tool having a handle, a pair of spaced apart wedge-shaped tongs extending outwardly therefrom and a shim support surface located between the pair of spaced-apart tongs is also provided. A shim having a nesting position between the pair of spaced-apart tongs on the shim support surface can be included and held or nested in the nesting position while the tool is used to separate or increase a distance between the component and the base plate. The distance created between the component and the base plate is such that the shim can slide underneath the stopper and be located behind the stopper and between the component and the base plate. Thereafter, the tool can be removed from between the component and the base plate with the shim remaining between the component and the base plate. In this manner, a predefined distance between the stopper and the base plate, or in the alternative, between the component and the base plate is provided.

A process for placing a shim between a component and a housing the tool described above is also provided. The process includes providing a housing with a component biased towards the housing, the component having a stopper or spacer extending from the component towards the housing. A tool as described above can be provided along with a shim having a predefined and desirable thickness, the shim nested between the pair of spaced-apart tongs and on the shim support surface of the tool. The wedge-shaped front end of each spaced-apart tong is located and pushed between the component and the housing, thereby providing a distance therebetween that is greater than the thickness of the shim. The shim is then allowed to slide from between the pair of spaced-apart tongs, between the stopper and base plate such that it is located behind the stopper and between the housing and the component. Thereafter, the wedge-shaped front end of each pair of spaced-apart tongs is removed from between the housing and the component with the shim remaining behind the stopper and between the housing and the component.

BRIEF DESCRIPTION OF THE DRAWINGS

FIG. 11 is a perspective view of the tool shown in FIGS. 10 and 11 inserting the shim into the housing shown in FIG. 8;

FIG. 12 is a side cross-sectional view of the tool shown in FIG. 11 inserting the shim into the housing shown in FIG. 8;

FIG. 13 is a side cross-sectional view of the tool shown in FIG. 11 completely inserted into the housing shown in FIG. 8;

FIG. 14 is a side cross-sectional view of the tool shown in FIG. 13 having been removed from the housing; and FIG. 15 is an end cross-sectional view of the tool shown in FIG. 12 with a pair of spaced-apart tongs aligned with a pair of spaced-apart step surfaces of the housing.

DETAILED DESCRIPTION OF THE INVENTION

Figure 1:
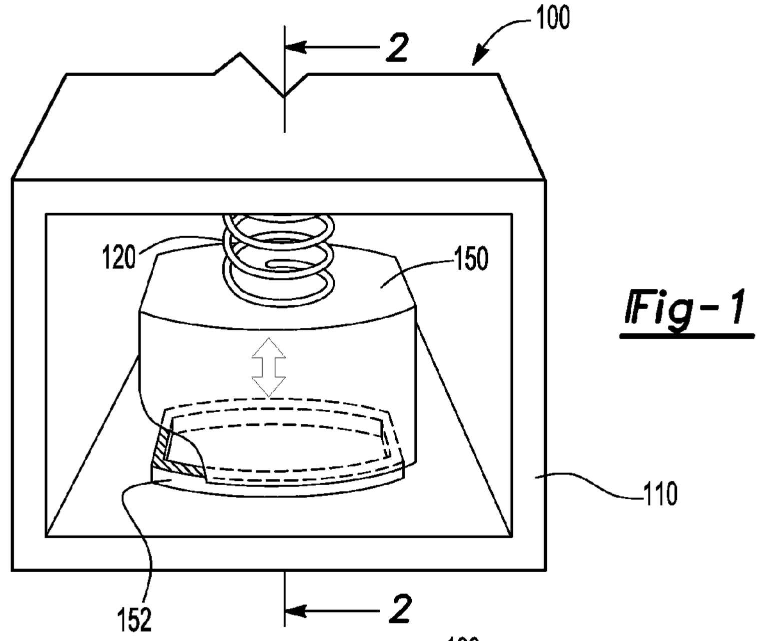
FIG. 1 is a perspective view illustrating a housing with a component biased towards the housing.

The present invention provides a tool and a process or placing a shim between a housing and a component biased towards the housing. As such, the present invention has utility as a tool and a process.

The tool can include a handle and a pair of spaced-apart tongs extending outwardly from the handle. A shim support surface can be located between the pair of spaced-apart tongs, the combination of the shim support surface and the pair of spaced-apart tongs being dimensioned such that a shim can nest between the tongs on the shim support surface.

Each of the pair of spaced-apart tongs can have a wedge-shaped front end that affords for sliding of the tongs between a housing and a component that is biased towards the housing. In this manner, a distance between the housing and the component can be increased and the shim that is nested between the pair of tongs can slide therefrom and to a position between the housing and the component.

In some instances, the component can have a stopper or spacer that extends towards the housing. In such an instance, each of the pair of spaced-apart tongs can have a predefined thickness that is greater than a distance the stopper extends from the component. In this manner, the tool ensures that the stopper will be spaced apart from the housing when the tool slides between the housing and the component. In addition, the predetermined thickness of the spaced-apart tongs can ensure the stopper is spaced apart from the housing at a distance that is greater than a thickness of the shim and thus the shim can slide between the stopper and the housing to a location behind the stopper. With the shim behind the stopper, and between the housing and the component, a desired and predefined distance that is generally equal to the thickness of the shim can be provided between the housing and the component.

It is appreciated that the stopper can have a width that is less than a distance between the pair of spaced-apart tongs such that the tongs can slide at least partially past the stopper. In addition, the housing can have a base plate with a pair of spaced-apart step surfaces, one of the step surfaces proximate to and spaced apart from one side of the stopper and another of the step surfaces proximate to and spaced apart from an opposite side of the stopper. In such an instance, each of the spaced-apart tongs can have a bottom surface with a rail or ridge that has a complementary step shape to the spaced-apart step surfaces of the housing. In this manner, the bottom surface of the spaced-apart tongs can be aligned with and slide on the pair of step surfaces of the housing.

An assembly of the tool along with the housing and the shim is also be provided. The assembly contains the tool, the shim and the housing with the component as described above.

It is appreciated that the housing with the component biased towards the housing can include a housing with a piston, friction lever, switch, cylinder, pedal arm and the like that can be used in various systems such as a clutch assembly, a pedal assembly, a brake assembly, etc.

A process for placing the shim between the housing and the component biased towards the housing is also provided. The process includes providing the housing with the component, the shim placement tool and the shim. The shim is placed between the pair of spaced-apart tongs on the shim support surface and the wedge-shaped front ends of the pair of spaced-apart tongs are pushed between the housing and the component in order to provide a distance therebetween. After the distance is such that the shim can slide between the housing and the stopper, the shim is afforded to slide out from between the pair of spaced-apart tongs, behind the stopper, and between the housing and the component. In this manner, a desired and predefined thickness between the component and the housing is provided.

Turning now to the figures, FIG. 1 illustrates a perspective view of a housing 100 with a component 150 biased towards a base plate 110 of the housing. For illustrative purposes only, the component 150 is biased using a spring 120 and the component can move in an up and down direction as illustrated by the double-headed arrow. It is appreciated that for the purposes of the present invention, the terms "up," "down" and "behind" are used in reference to the figures only and one skilled in the art will recognize that any orientation of the housing, component, tool, shim and the like can be included within the scope of the invention.

Figure 2:
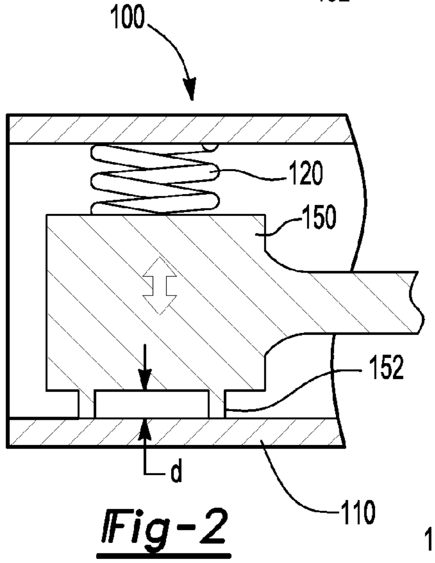
FIG. 2 is a side view of the section labeled 2-2 shown in FIG. 1.

In some instances, the component 150 can have a stopper 152 that extends from the component 150 towards the base plate 110. As shown in FIG. 2, the stopper 152 can provide a distance 'd' between the component 150 and the base plate 110. In addition, the stopper 152 may form a complete ring as shown in the figure, however this is not required. Stated differently, the stopper 152 can be a simple planar element located along one side, edge, etc., of the component 150 and/or housing 100. Similarly, the component 150 can have any shape known to those skilled in the art, illustratively including a cylindrical shape, a cube shape, a pyramidal shape and the like.

Figure 3:
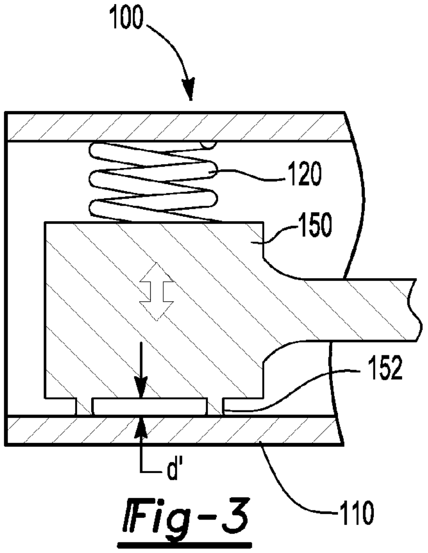
FIG. 3 is a side view of the section shown in FIG. 1 illustrating a damaged stopper.
Figure 4:
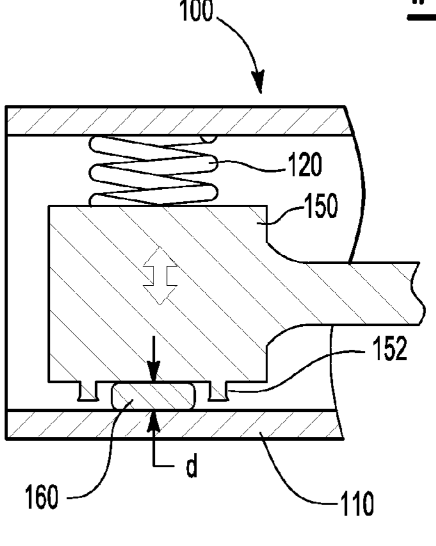
FIG. 4 is a side view of the section shown in FIG. 2 illustrating a shim placed between the component and the housing.

Turning now to FIG. 3, the stopper 152 is illustrated as having been become worn and/or failed during service and as the distance between the component 150 and the base plate 110 has decreased from d to d'. In the alternative to replacing the component 150 and/or the stopper 152, FIG. 4 illustrates a shim 160 placed between the component 150 and the base plate 110. In this manner, a shim having a thickness generally equal to the distance d can provide a desired spacing between the component 150 and the housing 100.

Figure 5:
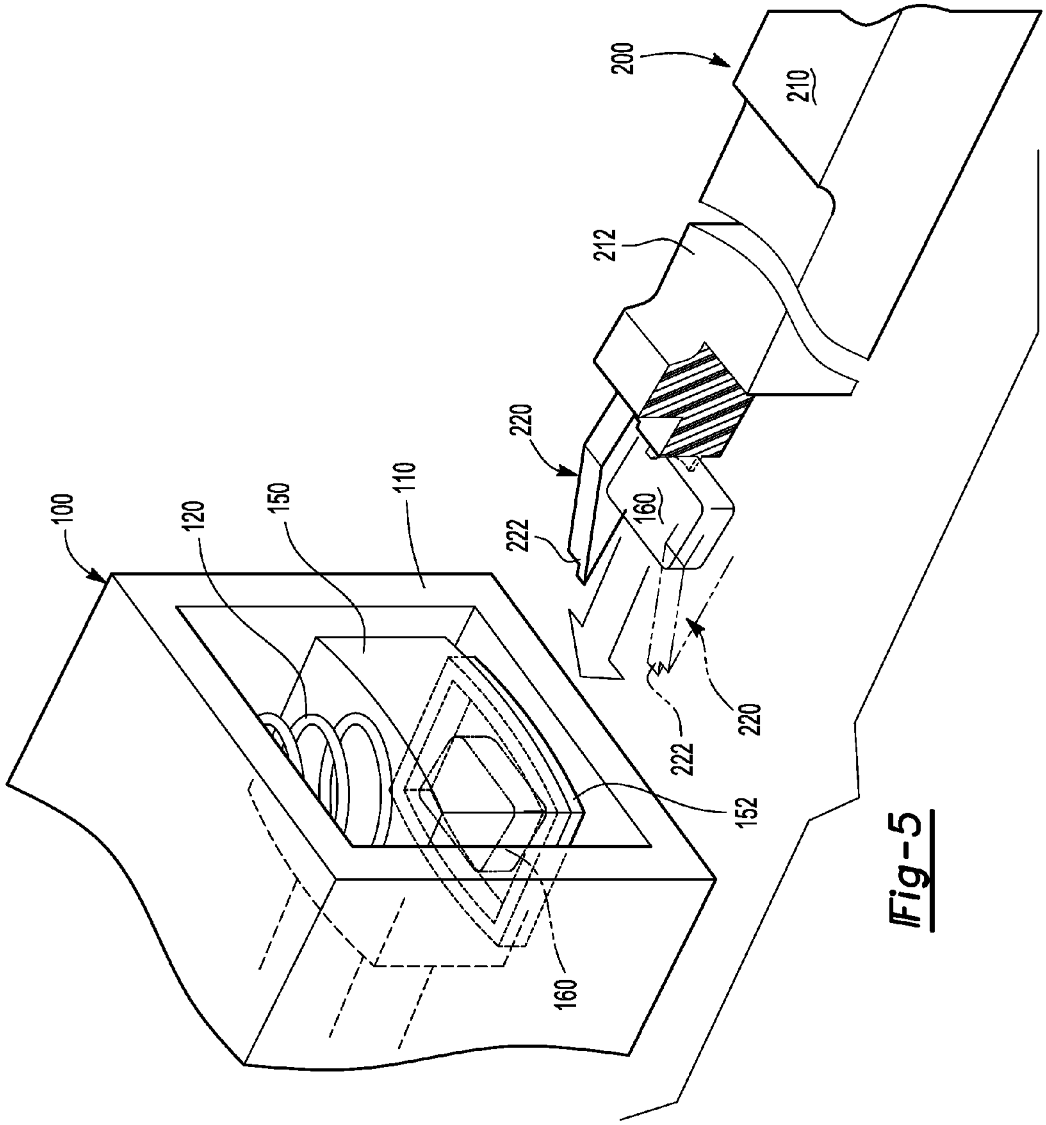
FIG. 5 is a perspective view illustrating the shim placed between the component and the housing, and behind the stopper.
Figure 6:
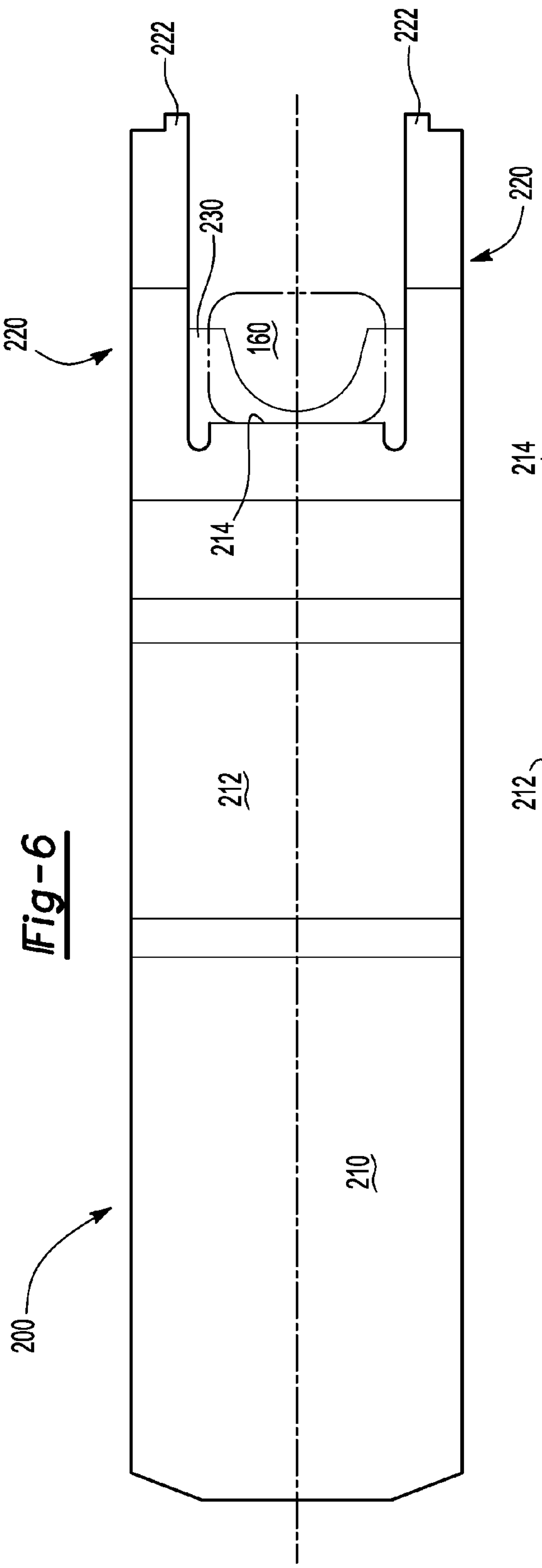
FIG. 6 is a top view of a tool according to an embodiment of the present invention.
Figure 7:
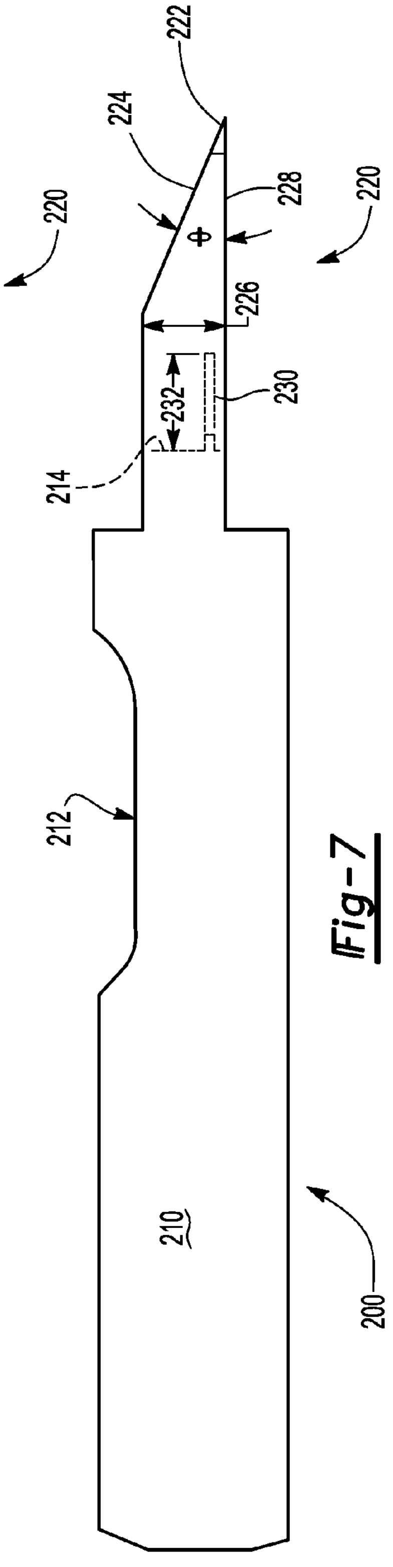
FIG. 7 is a side view of the tool shown in FIG. 5.

Turning now to FIGS. 5-7, a tool for placing the shim 160 between the component 150 and the base plate 110 of the housing 100 and behind the stopper 152 is shown. The tool 200 can have a handle 210 with a pair of spaced-apart tongs 220 extending from the handle. The handle can have a gripping portion 212 that affords for a user to grasp the handle and push and/or pull the tool 200 as described in greater detail below. The tool 200 can also have a shim support surface 230 that is located at least partially between the pair of spaced-apart tongs 220. As shown in FIG. 5, the shim 160 can be located between the pair of spaced-apart tongs 220 and on the shim support surface 230. In this manner, the shim 160 can be nested on or within the tool 200.

The pair of spaced-apart tongs 220 can have a front end 222 with a wedge-shaped surface 224. The wedge-shaped surface 224 can be inclined at an angle theta (θ) relative to a bottom surface 228 and extend from the front end 222 to a predefined thickness 226 of the tong 220. In addition, the shim support surface 230 can extend from the handle 220 a predefined distance as shown at reference numeral 232 and a backing surface 214 can be provided for the shim 160.

Figure 8:
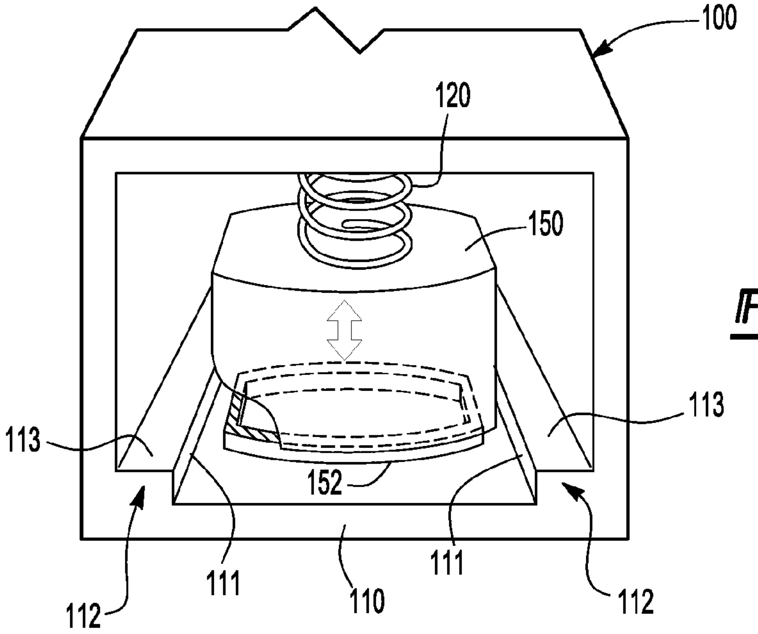
FIG. 8 is a perspective view illustrating a housing having two spaced-apart step surfaces.
Figure 9:
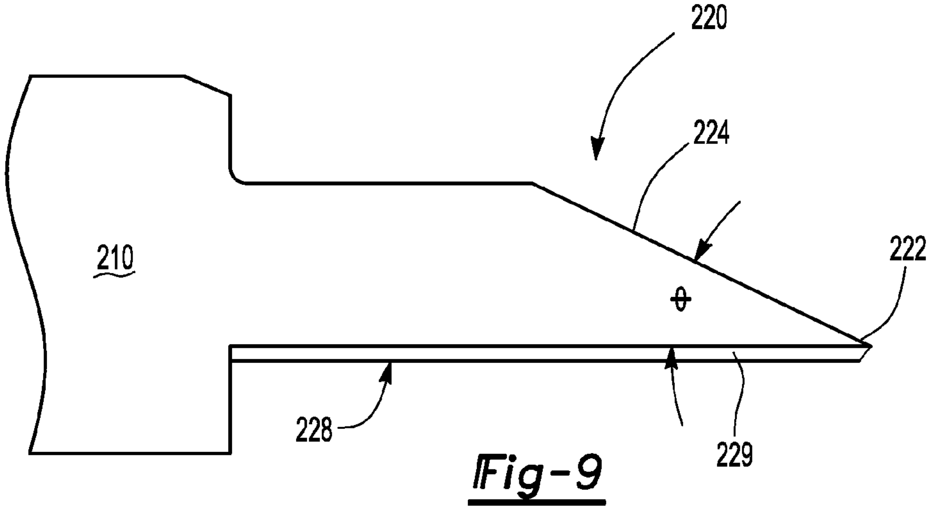
FIG. 9 is a side view of a tool having a bottom surface with a step surface according to an embodiment of the present invention.
Figure 10:
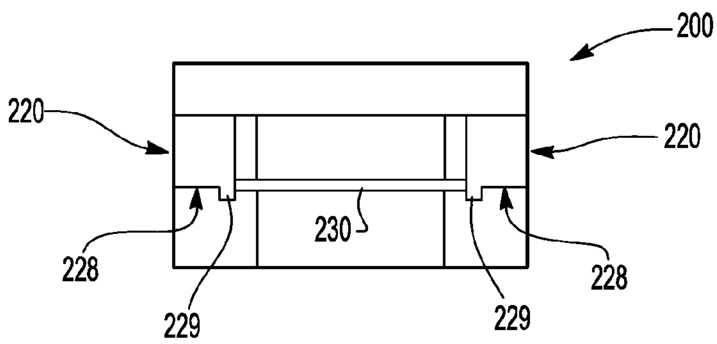
FIG. 10 is a front view of the tool shown in FIG. 10.

Turning now to FIG. 8, in some instances the housing 100 can have a pair of spaced-apart step surfaces 112. The step surfaces 112 can have a generally vertical portion 111 and a generally horizontal portion 113. It is appreciated that such step surfaces 112 can provide strength to the housing 100. In such an instance, the bottom surface 228 of the pair of spaced-apart tongs 220 can have a rail or ridge 229 that is complementary in shape to the step surfaces 112 of the housing 100. FIGS. 9 and 10 illustrate the bottom step-shaped surface 228 with the rail or ridge 229.

Turning now to FIGS. 11-14, the front end 222 of each of the spaced-apart tongs 220 can be placed between the component 150 and the base plate 110 of the housing 100. In addition, the tool 200 can be pushed in a direction 1 and thereby afford for the wedge-shaped surface 224 to slide between the component 150 and the housing 100. In this manner, the component 150 along with the stopper 152 is pushed or moved away from the base plate 110. In addition, the stopper 152 may or may not slide between the pair of spaced-apart tongs 220.

Upon pushing the pair of spaced-apart tongs 220 between the component 150 and the base plate 110, a distance between the stopper 152 and the base plate 110 will increase until the shim 160 can slide therebetween. As illustrated in FIGS. 5 and 13, the tool affords for the shim 160 to slide past the stopper 152 and come to rest at a position between the component 150 and the base plate 110. Thereafter, the tool 200 can be pulled from between the component 150 and the housing 100 such that the shim remains behind the stopper 152 and can provide a desired and predefined distance between the component 150 and the base plate 110 as illustrated in FIG. 14. In this manner, the desired and predefined distance can be obtained without replacement of the component 150 and/or the stopper 152.

It is appreciated that sliding of the shim 160 from its nested position on the tool 200 to its position between the component 150 and the base plate 110 can be afforded by any means, process, etc., known to one skilled in the art. For example and for illustrative purposes only, the tool 200 can be held or tilted in a generally downward direction, with or without shaking by a user, such that gravity will result in the shim 160 sliding in the generally downward direction from between the pair of spaced-apart tongs 220 to between the component 150 and the base plate 110, behind the stopper 152.

Regarding the housing 100 having pair of spaced-apart step surfaces 112, FIG. 15 illustrates how the pair of spaced-apart tongs 220 can be aligned with the pair of spaced-apart step surfaces 112.

The tool 200 can be made from any material known to those skilled in the art such as metals, alloys, plastics, ceramics, wood, etc. In addition, the shim can be any suitable material that provides the desired thickness for a desired time between a component and a housing for a given set of operating conditions. Although a spring-biased component is illustrated in the figures, it is appreciated that other types of biasing such as magnetic biasing, gravity biasing and the like are included within the scope of the present invention.

The invention is not restricted to the illustrative examples or embodiments described above. The examples or embodiments are not intended as limitations on the scope of the invention. Processes, apparatus, compositions, and the like described herein are exemplary and not intended as limitations on the scope of the invention. Changes herein and other uses will occur to those skilled in the art. The scope of the invention is defined by the scope of the claims.

We claim:

1. A tool and housing combination for placing a shim between the housing and a component biased towards the housing, said tool and housing combination comprising:

a housing and a component biased towards said housing, said component having a base and a stopper extending from said base towards said housing;

a handle;

a pair of spaced-apart tongs extending outwardly from said handle, said pair of spaced-apart tongs each having a wedge-shaped front end operable to slide between said housing and said component and increase a distance therebetween in order for the shim to slide therebetween; and a shim support surface located between said pair of spaced-apart tongs;

said spaced-apart tongs and said shim support surface dimensioned for a shim to nest between said pair of spaced-apart tongs on said shim support surface.

2. The tool of claim 1, wherein each spaced-apart tong has a predefined thickness greater than a distance said stopper extends from said base, said stopper spaced apart from said housing a distance greater than a thickness of the shim when said pair of spaced-apart tongs slide between said component and said housing, the shim operable to slide between said stopper and said housing.

3. The tool of claim 2, wherein said stopper has a width, said width less than a distance between said pair of spaced-apart tongs, said pair of spaced-apart tongs operable to slide at least partially past said stopper.

4. The tool of claim 1, wherein said housing has a pair of spaced-apart step surfaces with one step surface proximate to and spaced apart from one side of said stopper and one step surface proximate to and spaced apart from an opposite side of said stopper.

5. The tool of claim 4, wherein each of said spaced-apart tongs has a step-shaped bottom surface, each step-shaped bottom surface complementary in shape to one of said pair of spaced-apart step surfaces of said housing.

6. The tool of claim 1, further comprising a shim nested between said pair of spaced-apart tongs on top of said shim support surface.

7. The tool of claim 6, wherein said wedge-shaped front end of said each pair of spaced-apart tongs pushes said component and said stopper in a direction away from said housing when said pair of spaced-apart tongs are inserted and pushed between said component and said housing.

8. The tool of claim 7, wherein said shim nested between said pair of spaced-apart tongs on top of said shim support surface slides underneath and behind said stopper.

9. A process for placing a shim between a component and a housing, the component biased towards the housing, the process comprising:

providing a housing;

providing a component biased towards said housing, the component having a base and a stopper extending from the base towards the housing;

providing a shim placement tool having:

a handle;

a pair of spaced-apart tongs having a wedge-shaped front end extending outwardly from the handle; and a shim support surface located between the pair of spaced-apart tongs, the shim support surface dimensioned for a shim to be placed thereon and held between the pair of spaced-apart tongs;

providing a shim dimensioned to nest between the pair of spaced-apart tongs on the shim support surface;

placing the shim between the pair of spaced-apart tongs on the shim support surface;

pushing the wedge-shaped front end of each pair of spaced-apart tongs between the housing and the component and providing a distance therebetween greater than a thickness of the shim;

sliding the shim from between the pair of spaced-apart tongs to behind the stopper and between the housing and the component;

removing the wedge-shaped front end of each pair of spaced-apart tongs from between the housing and the component with the shim remaining behind the stopper and between the housing and the component.

10. The process of claim 9, wherein each spaced-apart tong has a thickness greater than a distance the stopper extends from the base.

11. The process of claim 10, wherein a distance between the pair of spaced-apart tongs is greater than a width of the stopper, the pair of spaced-apart tongs sliding at least partially past the stopper.

12. The process of claim 11, wherein the housing has a pair of raised step surfaces spaced apart by a distance greater than the width of the stopper, the stopper located at least partially between the pair of raised step surfaces.

13. The process of claim 12, wherein each spaced-apart tong has a bottom surface with a step-shaped surface complementary in shape to each housing raised step surface.

14. The process of claim 13, wherein at least part of each spaced-apart tong slides between the housing spaced-apart step surfaces when the wedge-shaped front end of each pair of spaced-apart tongs is pushed between the housing and the component.

15. A housing, tool and shim assembly for placing a shim between a housing and a spring-loaded component, said assembly comprising:

a housing having a base plate and a component biased towards said base plate, said component having a stopper extending towards said base plate;

a tool having a handle, a pair of spaced apart wedge-shaped tongs extending outwardly from said handle and a shim support surface located between said pair of spaced-apart tongs;

a shim having a nesting position between said pair of spaced-apart tongs on said shim support surface;

said tool operable to slide said pair of spaced apart wedge-shaped tongs between said base plate and said component, increase a distance therebetween and allow said shim to slide from said nesting position to behind said stopper between said base plate and said component;

said tool also operable to remove said pair of spaced apart wedge-shaped tongs from between said base plate and said component and leave said shim therebetween.

16. The assembly of claim 15, wherein said housing has a pair of raised step surfaces spaced apart by a distance greater than a width of said stopper, said stopper located at least partially between said pair of raised step surfaces.

17. The assembly of claim 16, wherein each spaced-apart tong has a bottom surface with a step-shaped surface complementary in shape to each housing raised step surface.

* * * * *